(12) United States Patent
Dixon et al.

(10) Patent No.: US 8,561,510 B1
(45) Date of Patent: Oct. 22, 2013

(54) ADJUSTABLE FOAM INSERTION MACHINE

(75) Inventors: David Dixon, Camdenton, MO (US); Scott Burke, Wichita, KS (US)

(73) Assignee: David Dixon, Camdenton, MO (US)

(*) Notice: Subject to any disclaimer, the term of this patent is extended or adjusted under 35 U.S.C. 154(b) by 636 days.

(21) Appl. No.: 12/696,823

(22) Filed: Jan. 29, 2010

Related U.S. Application Data

(60) Provisional application No. 61/206,421, filed on Feb. 2, 2009.

(51) Int. Cl.
*B62D 5/26* (2006.01)
(52) U.S. Cl.
USPC .................................. 83/78; 83/202; 83/232
(58) Field of Classification Search
USPC ........... 83/78, 88, 96, 110, 236, 261, 262, 74, 83/76, 104, 80, 106, 202, 234, 232, 241, 83/203, 247, 374, 208, 282, 420, 422
See application file for complete search history.

(56) References Cited

U.S. PATENT DOCUMENTS

| | | | | |
|---|---|---|---|---|
| 3,029,775 A | * | 4/1962 | Nicholson | 118/672 |
| 4,257,295 A | * | 3/1981 | Patel | 83/374 |
| 4,513,647 A | * | 4/1985 | Eckelt et al. | 83/203 |

OTHER PUBLICATIONS

Website of OTB Machinery, Inc., of Thomasville, NC, Title: Table Top Super Shooter and Super Shooter 870 found at www.otbmachinery/ss.com.

* cited by examiner

*Primary Examiner* — Ghassem Alie
(74) *Attorney, Agent, or Firm* — Kevin L. Klug

(57) ABSTRACT

An adjustable foam insertion machine capable of inserting foam spacers of a user desired length into channels of cabinetry frames or other types of channels. The apparatus has a frame, a foam material feed, a foam material cutter assembly, a foam material holder, a foam material inserter, and a controller which controls and coordinates the operation of the aforesaid. The apparatus utilizes rolls of foam material, cuts them to a user desired length of foam spacer, and inserts the foam spacers pursuant to a user input. The apparatus is capable of quick, safe, and repeated foam spacer insertion without the requirement of a user feeding or utilizing pre-cut spacers or inserts.

19 Claims, 12 Drawing Sheets

ADJUSTABLE FOAM INSERTION MACHINE

This application claims priority of U.S. Provisional Patent Application No. 61/206,421, filed Feb. 2, 2009, entitled Adjustable Foam Insertion Machine.

BACKGROUND OF THE INVENTION

The art of the present invention relates to cabinetry construction equipment in general and more particularly to an apparatus and method of use which automates the time and labor intensive task of installing foam rubber expansion spacers into cabinet door frames prior to assembly.

Cabinet and other types of frames often have one or more slots or channels within an inside periphery into which the cabinet panels and other portions of the frame fit, seat, and/or mate. The slot or channel typically has a "U" shape with sidewalls and a bottom wall. When the frame is assembled from individual frame pieces, the separation of the channel bottom walls, i.e. base of the "U" shape, from frame top to bottom and from frame side to side is generally slightly greater than the cabinet panel top to bottom and side to side dimensions respectively, thereby creating a gap when the frame is assembled with a panel. This gap allows or compensates for thermal and humidity expansion and contraction and tolerance variations. In order to minimize any movement or noise of the assembled cabinet and panel, one or more short strips or inserts of foam rubber are placed within and around the frame channel prior to assembly of the frame and panel. The short strips or inserts of foam rubber compress when the frame and panel is fully assembled and ensure a positive hold of the panel and further provide for component expansion and contraction without cabinet deformation.

The foam rubber insert material is generally supplied in bulk rolls and requires precise cutting to form the strip inserts for the channels. Prior art devices generally require precut inserts which seriously increase assembly time and cost. For informational purposes only, a common width for said bulk material is approximately one inch in width and ¼ inch in thickness with a plurality of other sizes available. The present art adjustable foam insertion machine automates the process of foam rubber insertion by precisely cutting and inserting the foam rubber from multiple rolls. Unlike the prior art, the present art utilizes multiple rolls (preferably up to five) of foam rubber in a horizontal position and uses a roller or guide mechanism to vertically locate the foam rubber prior to cutting and inserting. The prior art machines utilize a single roll which is vertically positioned on the machine.

The preferred embodiment of the present art utilizes a step motor which feeds the foam rubber which is thereafter cut and inserted into the cabinetry component. The present art allows an adjustable length foam rubber material cut. The present art machine also allows customization of the cut length at the individual cabinetry shop in order to compensate for tolerances and/or other factors such as changes in humidity.

In the preferred embodiment, the present art utilizes pneumatic actuators, i.e. air cylinders, to cut, hold, and insert the individual foam rubber pieces. A bottom pneumatic actuator holds the bulk foam rubber material in place during the cutting process, a top pneumatic actuator cuts the foam rubber to a manufacturer desired length, and a middle pneumatic actuator inserts the cut foam rubber into the slot or channel. The present art provides a faster cycle time than the prior art as the cut foam rubber insert is formed each time the machine is cycled. The precut operation allows the foam rubber to be inserted immediately upon activation of the machine by an operator. Unlike the prior art, the present art provides quick and easy adjustability of the foam rubber insert material size.

Accordingly, it is an object of the present invention to provide an adjustable foam insertion machine and method of use which is capable of delivering and inserting a repeatable and programmed length of foam material within a channel of a frame.

Another object of the present invention is to provide an adjustable foam insertion machine and method of use which does not require manual foam insertion by an operator.

Another object of the present invention is to provide an adjustable foam insertion machine and method of use which is capable of quickly and economically inserting one or more lengths of foam material with a minimum of operator interface.

SUMMARY OF THE INVENTION

To accomplish the foregoing and other objects of this invention there is provided an adjustable foam insertion machine and method of use. The apparatus allows a user to automatically cut foam spacers from a bulk roll of foam material and insert said spacers into a channel of a cabinetry frame in a single operation. The apparatus allows a user to quickly and repeatedly insert foam spacers into a frame without the requirement of precutting the spacers.

As understood within the mechanical arts, precise cutting and feeding of a thin, flexible, and compressible foam material in order to form a narrow strip or foam spacer which is inserted into a frame channel is difficult to perform without jamming, feeding, or dimensional irregularities. The present art provides all of the aforesaid cutting, feeding, and insertion without mechanical issues expected or found within the prior art.

In its preferred embodiment, the apparatus comprises a frame, a controller, a work table mounted with said frame, a foam material feed, a foam material cutter assembly, a foam material holder, a foam material inserter, pneumatic valves (fed with a compressed air supply) connected with the actuators and one or more (preferably two) actuation switches.

The work table preferably sits atop the frame and is sized and configured at the front portion to allow the frame work piece to interface and mate with the machine (i.e. a fence) during the insertion process. One or more switches extend from a fence on the table and trigger insertion when the frame piece is positioned there against.

The foam material feed introduces or injects the bulk foam material into the foam material cutter assembly which performs substantially two operations when actuated. That is, the foam material cutter assembly cuts a preprogrammed length of foam and allows the foam material inserter to insert the foam spacer into the cabinetry frame. The foam material holder allows the cut foam spacer to be guided to an exiting slot whereby the inserter injects the foam spacer into a channel of the cabinetry frame.

For the preferred embodiment, pneumatic actuators feed, cut, and insert the foam material via the actuation of one or more pneumatic valves which are controlled by the controller. The controller is preferably any type of electronic controller or programmable logic device (as understood within the mechanical and electronic arts) which can provide time sequenced on, off, and drive signals to control the aforesaid components. The controller program operation and flow is described via the operation of the aforesaid and further described interacting mechanical components.

The present art apparatus is capable of storing one or more bulk rolls of foam material, feed said foam material, cut said foam material, and insert or inject said foam material, all when the user places a channeled workpiece onto the work table. All of the aforesaid is accomplished in a quick, efficient, safe, and convenient fashion.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
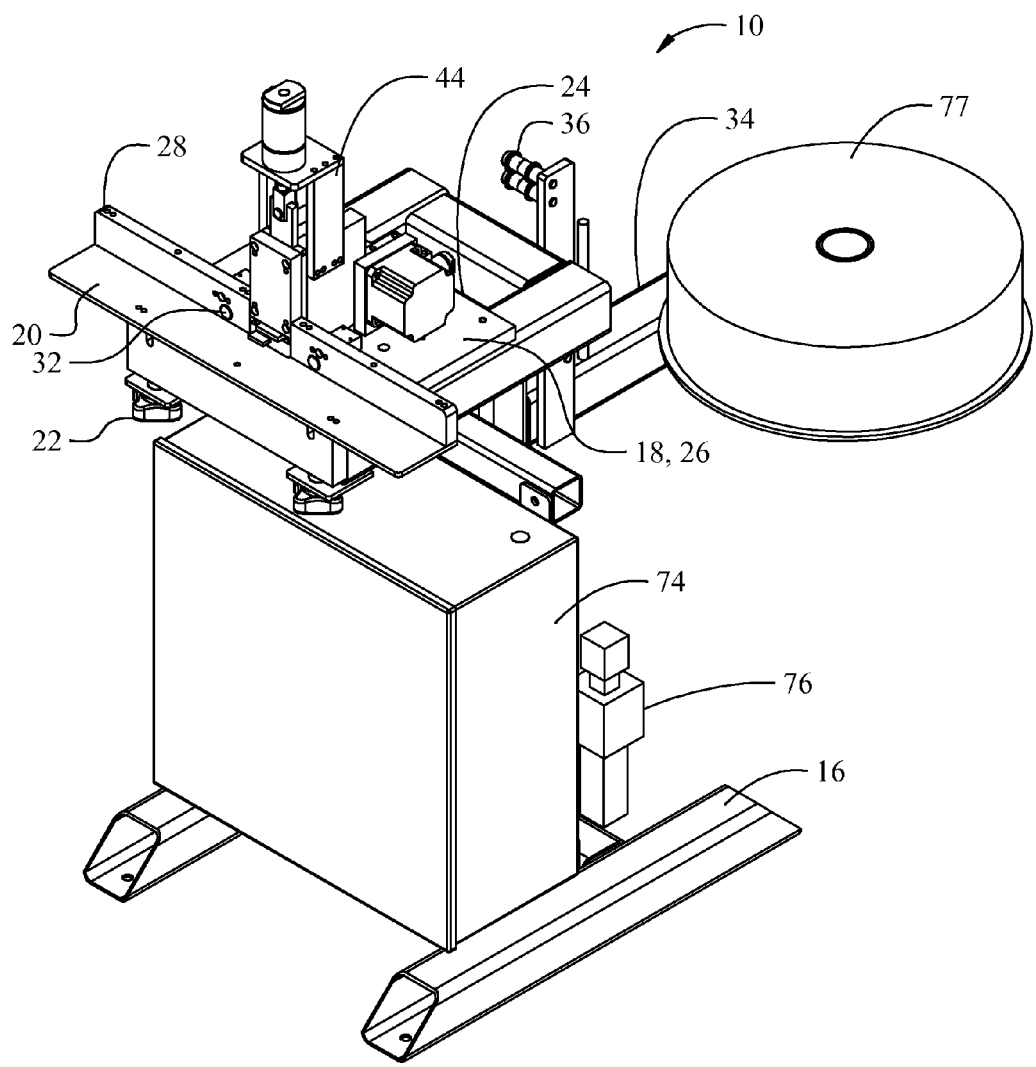
FIG. 1 is a right front perspective view of an adjustable foam insertion machine.
Figure 2:
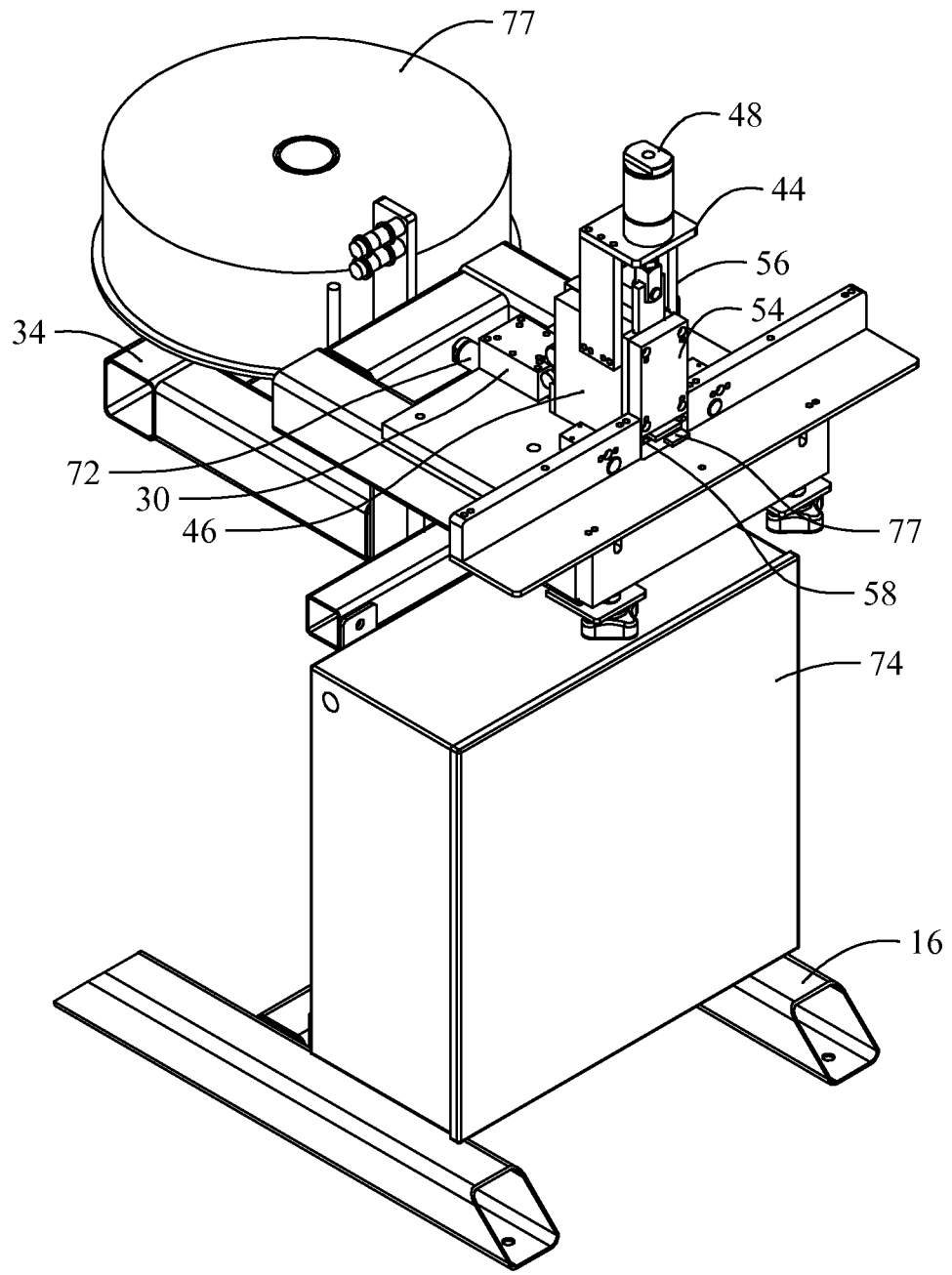
FIG. 2 is a left front perspective view thereof.
Figure 3:
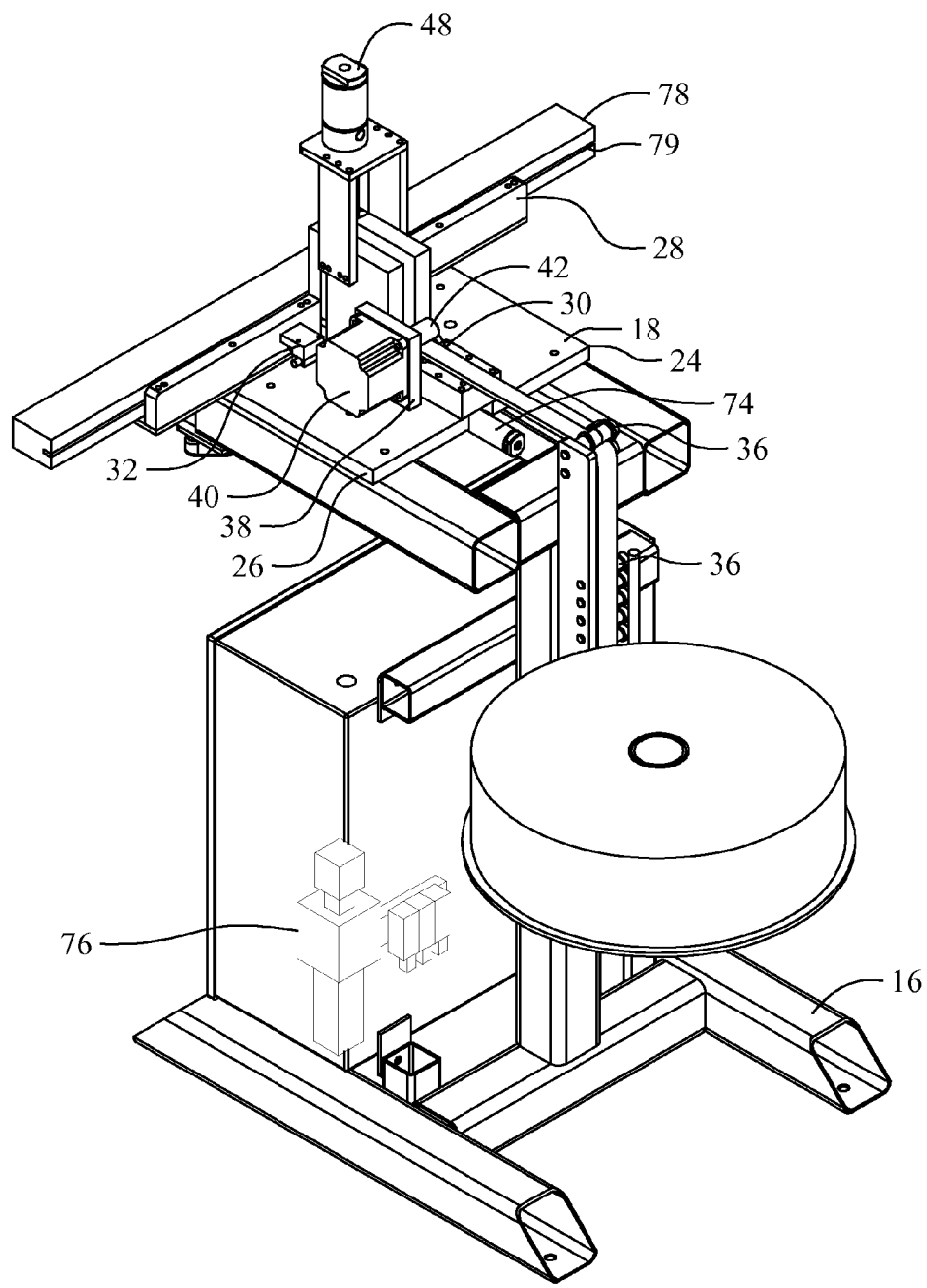
FIG. 3 is a left rear perspective view thereof.
Figure 4:
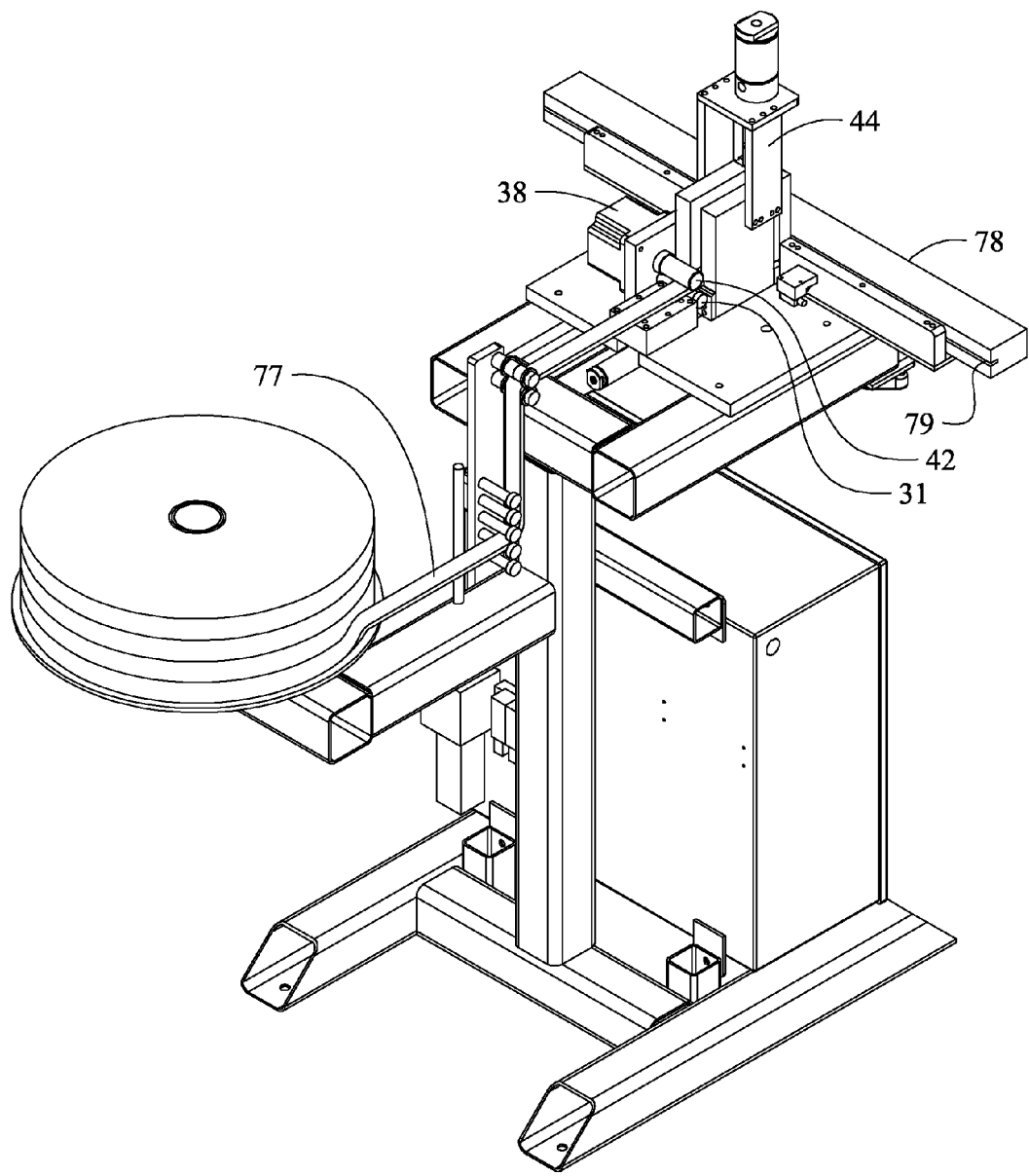
FIG. 4 is a right rear perspective view thereof.
Figure 5:
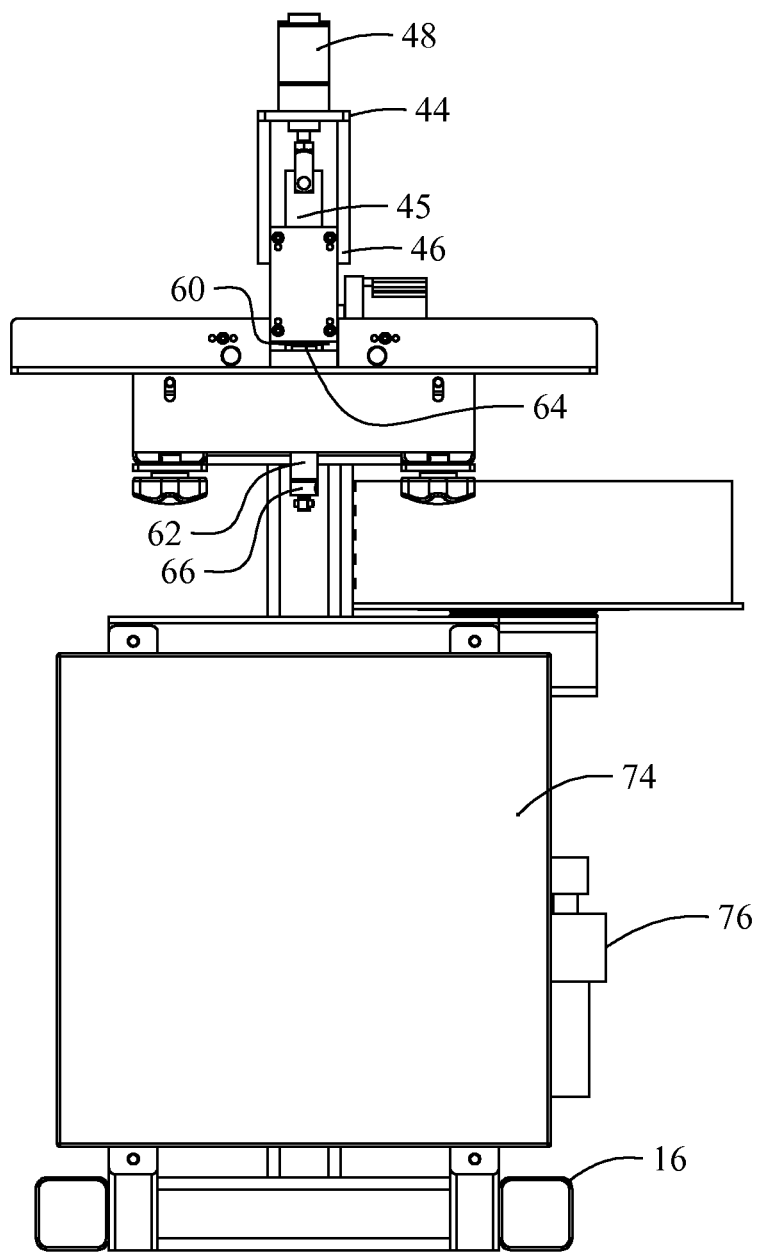
FIG. 5 is a front plan view thereof.
Figure 6:
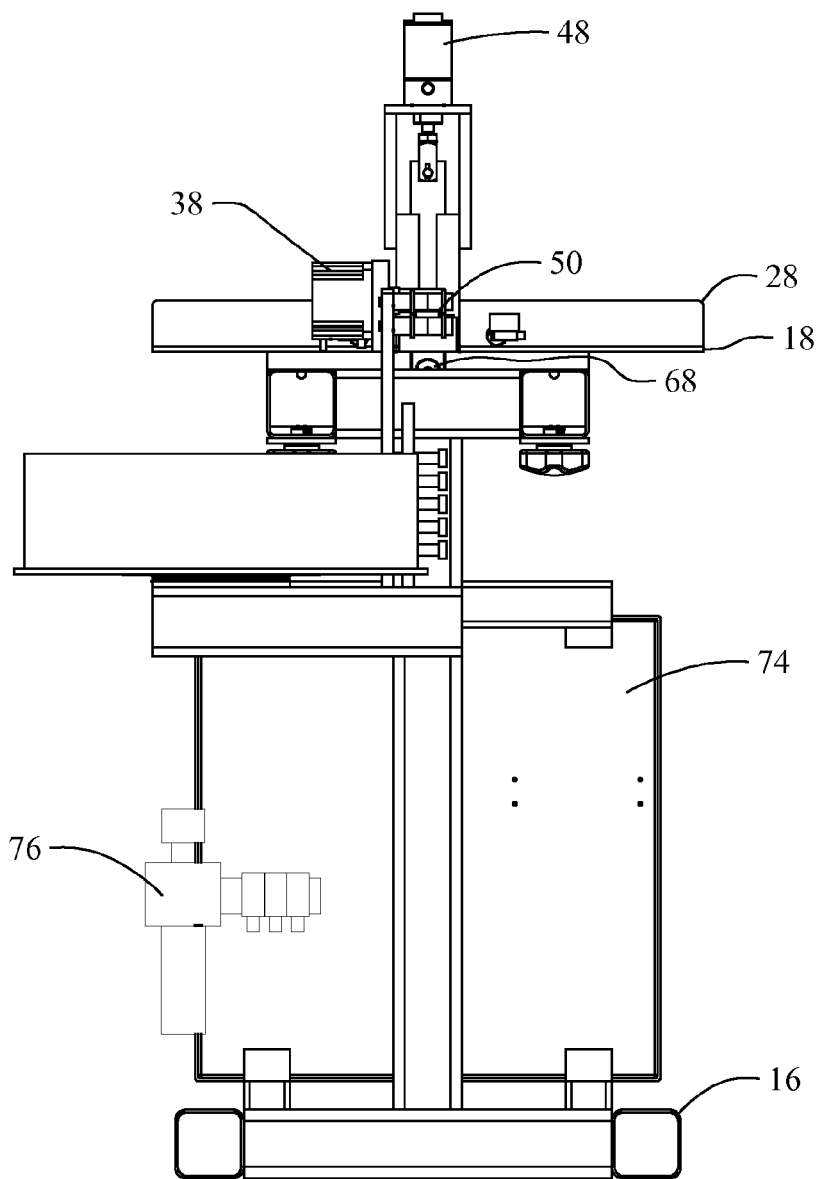
FIG. 6 is a rear plan view thereof.
Figure 7:
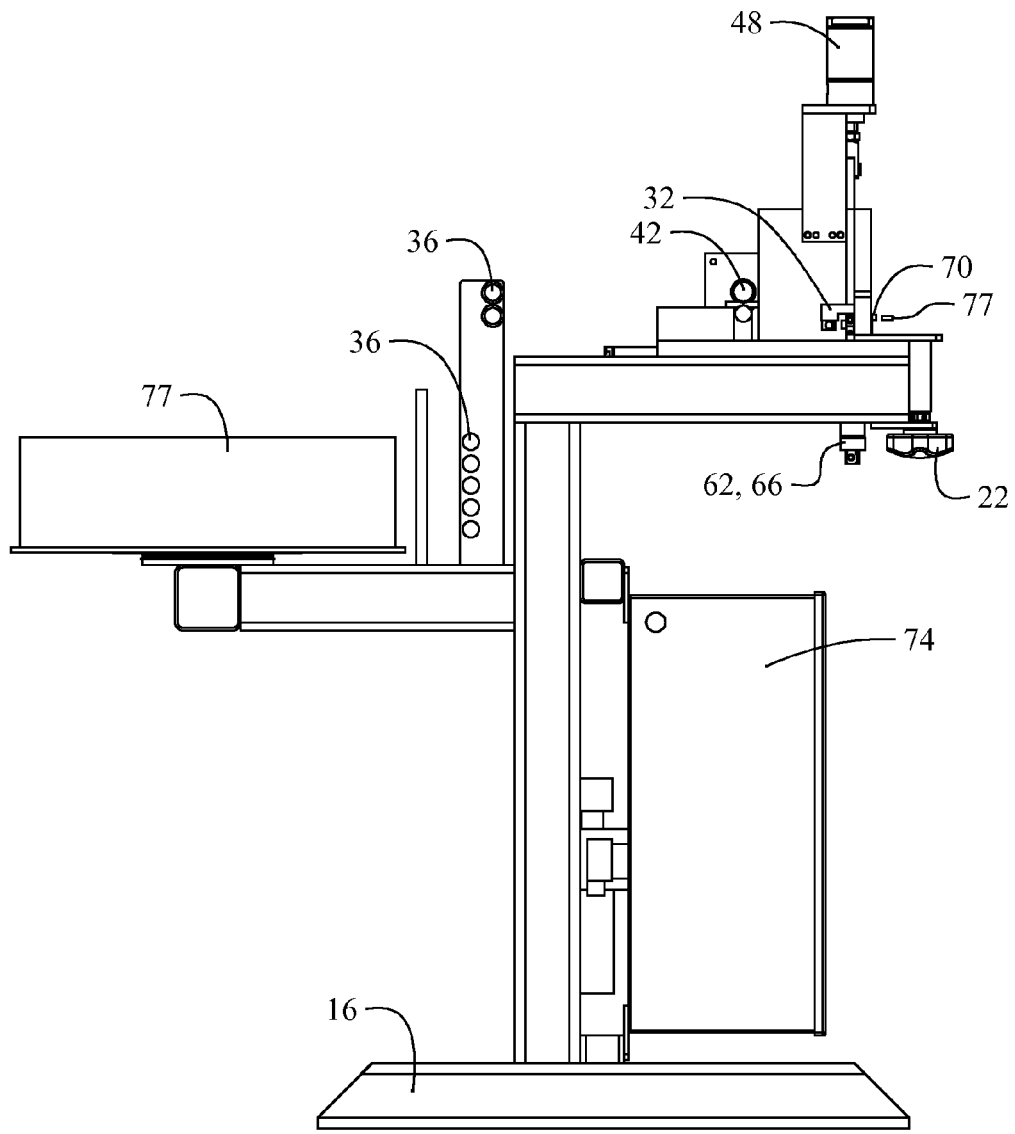
FIG. 7 is a left plan view thereof.
Figure 8:
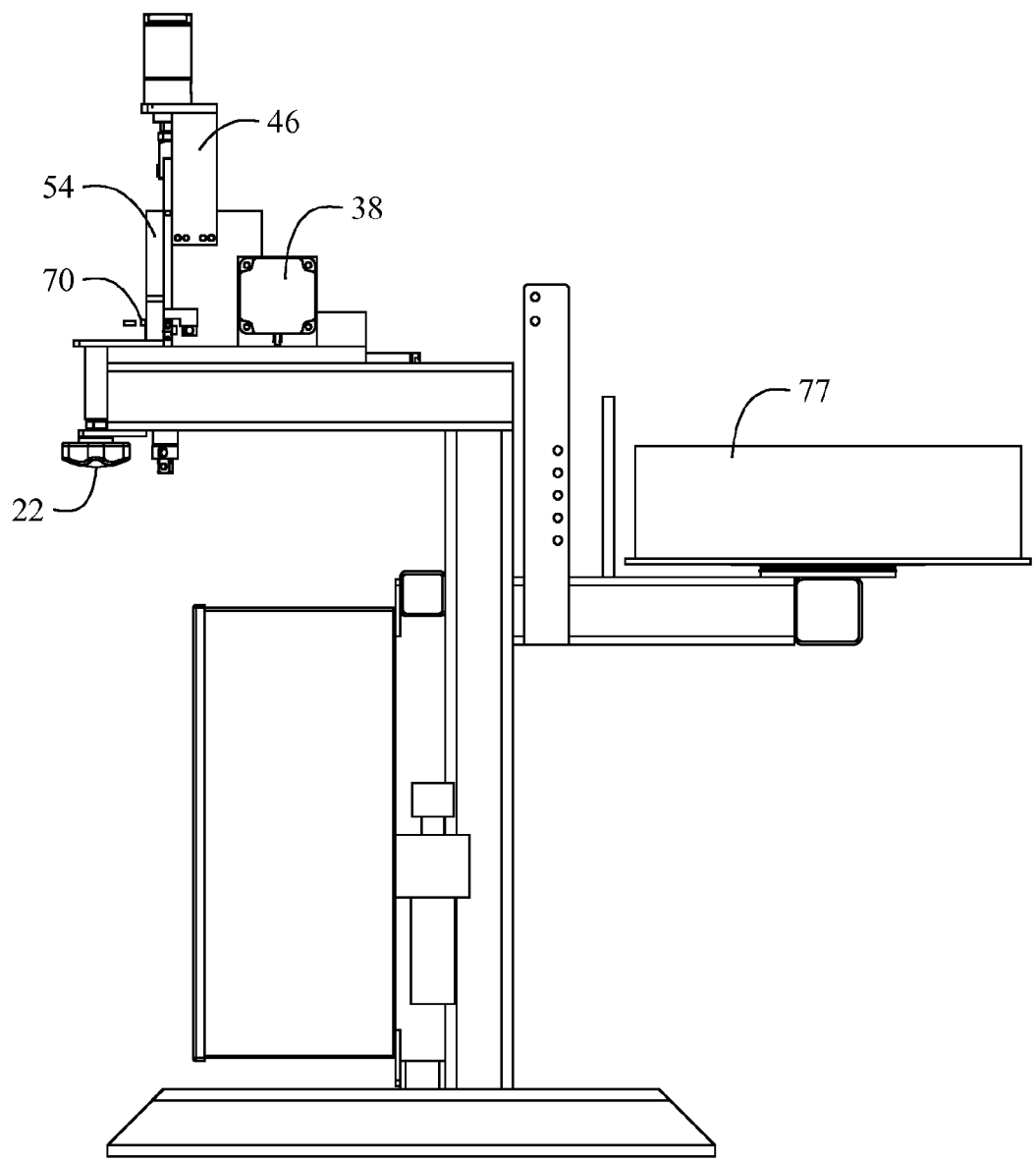
FIG. 8 is a right plan view thereof.
Figure 9:
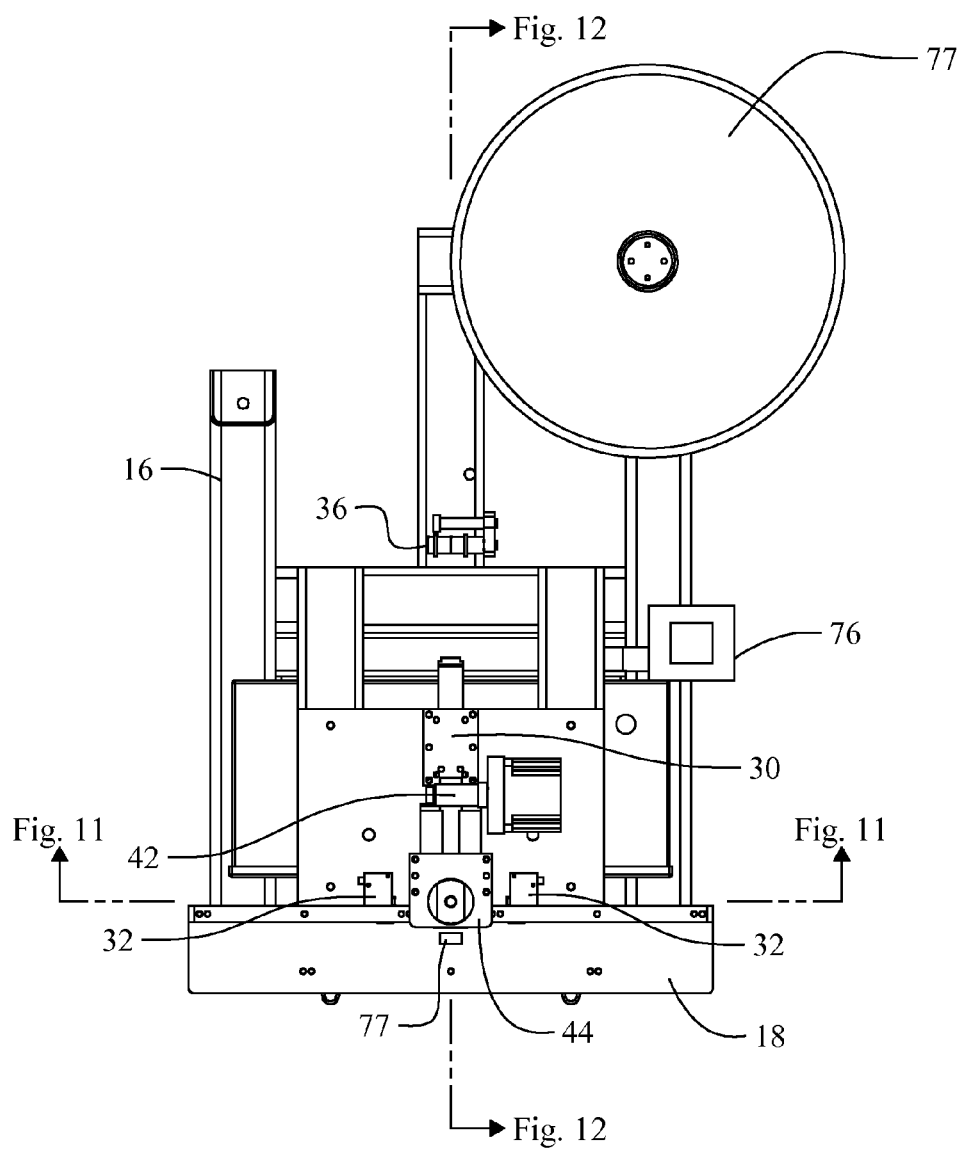
FIG. 9 is a top plan view thereof.
Figure 10:
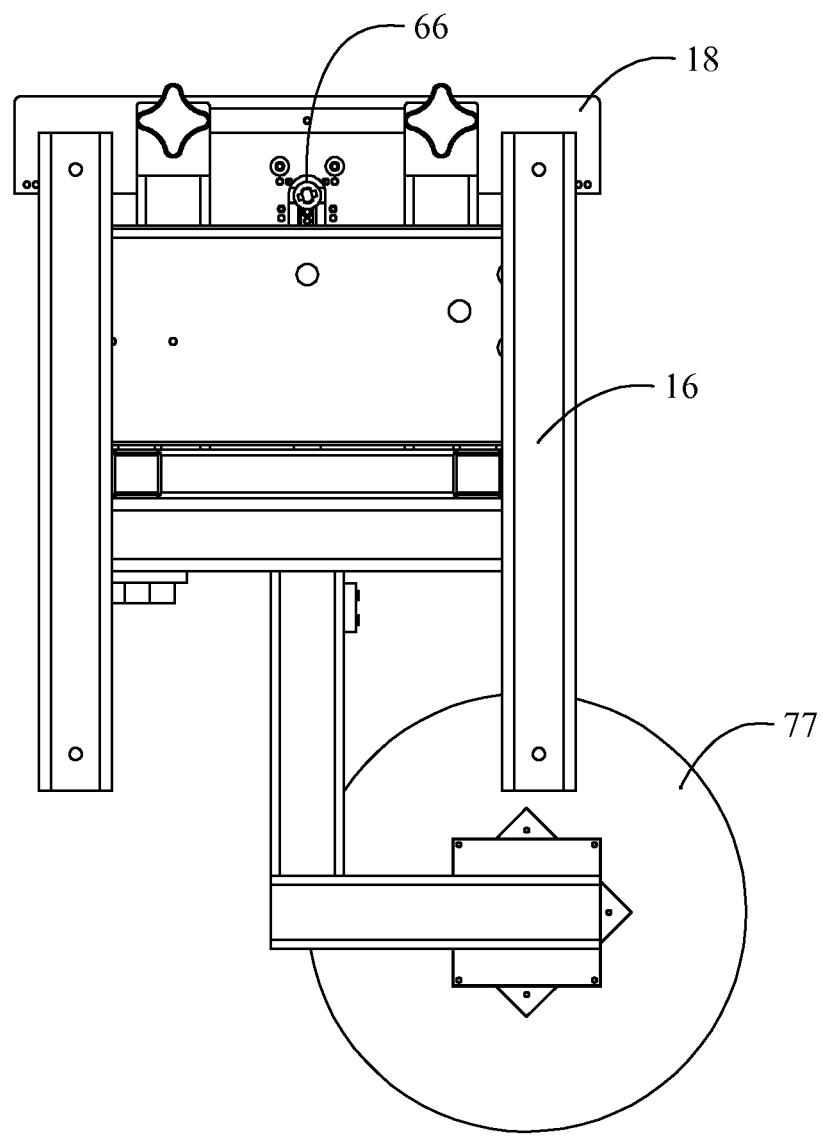
FIG. 10 is a bottom plan view thereof.
Figure 11:
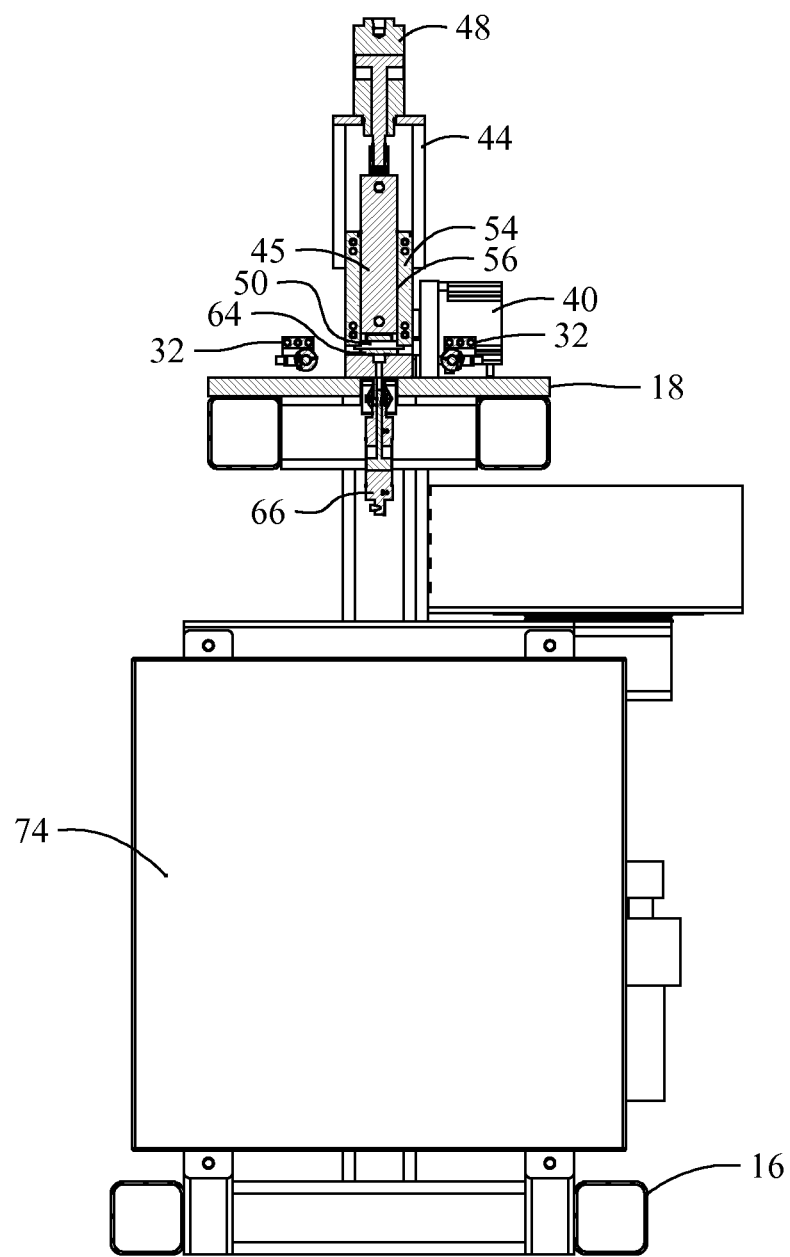
FIG. 11 is a cross sectional view taken along line FIG. 11-FIG. 11 of FIG. 9.
Figure 12:
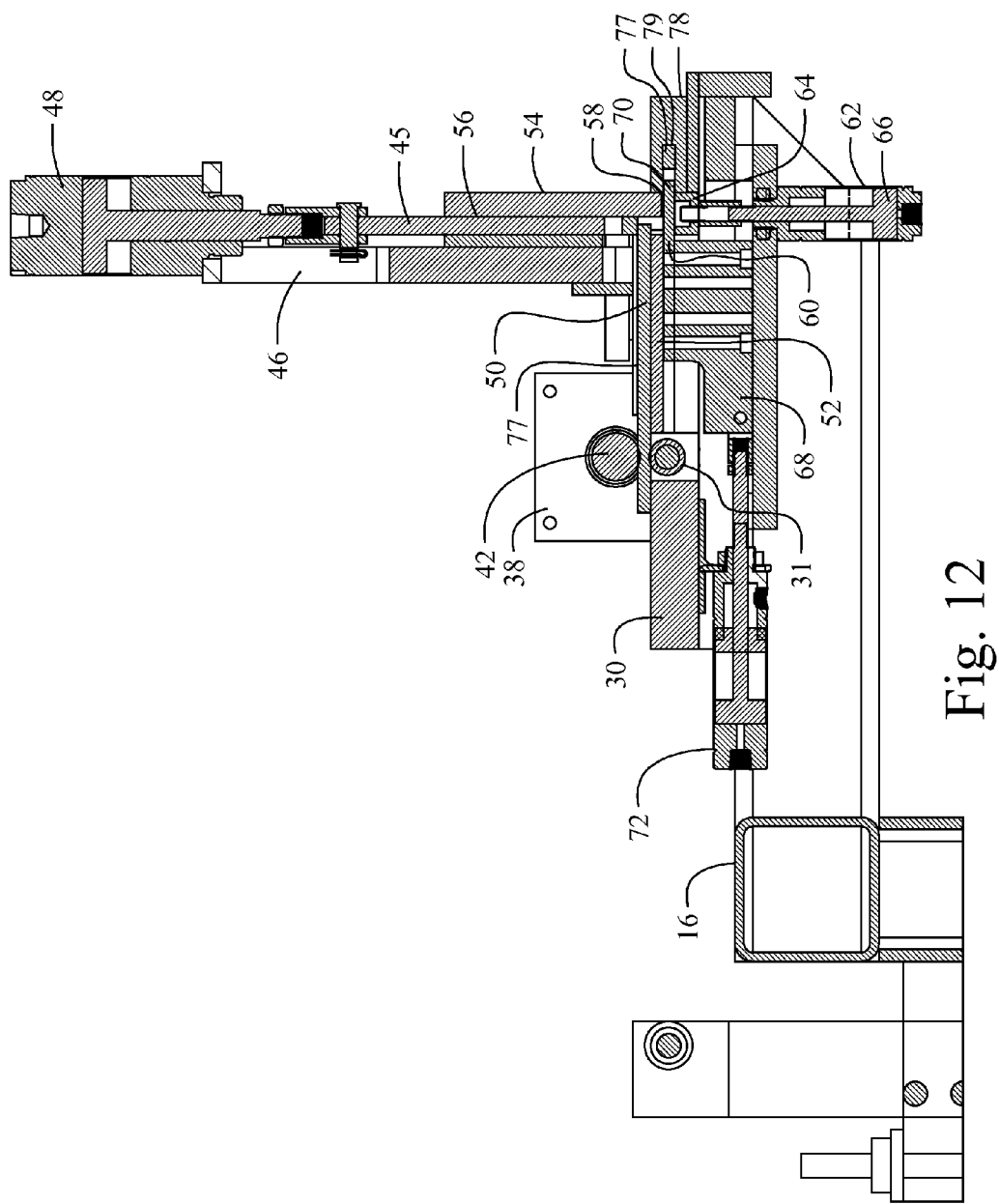
FIG. 12 is a cross sectional view taken along line FIG. 12-FIG. 12 of FIG. 9.

The preferred embodiment of the present art adjustable foam insertion machine 10 comprises a frame 16, a controller 74, a work table 18 mounted with said frame 16, a foam material feed 38, a foam material cutter assembly 44, a foam material holder 62, a foam material inserter 68, pneumatic valves 76 (fed with a compressed air supply) connected with the actuators 48, 66, 72 and one or more (preferably two) actuation switches 32. The controller 74 is preferably an electronic box (i.e. microprocessor, microcontroller, embedded personal computer, programmable logic controller, or equivalent) which has one or more controls to feed the material 77 and allow the apparatus 10 to cycle pursuant to an input from the actuation switch(es) 32. Alternative embodiments may utilize pneumatic, hydraulic, or mechanical controllers without departing from the scope and spirit of the present invention.

The work table 18 preferably sits atop the frame 16 and has a front portion 20, a rear portion 24, and two or more sides 26. The work table 18 is sized and configured at the front portion 20 to allow the frame work piece 78 to interface and mate with the machine 10 during the insertion process. The one or more switches 32 extend from a fence 28 on the table 18 and trigger insertion when the frame piece 78 is positioned there against.

For the preferred embodiment, the foam material feed 38 comprises a stepper motor 40 interfaced with the controller 74. The stepper motor 40 has a serrated drive wheel 42 which drives the foam material 77 into an entrance slot 50 within the foam material cutter assembly 44. For the preferred embodiment, the drive wheel 42 compresses the foam material 77 against a raised portion 30 of the work table 18 and/or an idler wheel 31. As the drive wheel 42 rotates, the serrations of the drive wheel 42 engage the foam material 77 and feed it towards the cutter assembly 44. Unique to the present art is the ability of the controller 74 to control the precise rotation of the stepper motor 40. This allows precise control and adjustability of the length of foam material 77 inserted into the cutter assembly 44 and thereby allows precise control of the foam material 77 cut length. A manufacturer can program the controller 74 for any length of foam 77 insertion (foam spacer length) desired. Also for the preferred embodiment, the entrance slot 50 of the cutter assembly 44 is offset or at a higher level than the exiting slot 58 of the cutter assembly 44. The foam material 77 is fed into the entrance slot 50 as described, cut by the cutter 45 of the cutter assembly 44, and exits the exiting slot 58 via the action of the foam material inserter 68.

Again for the preferred embodiment, the cutter assembly 44 comprises a mount 46 attached with and extending from the work table 18, a cutter housing 54 mounted therewith, a cutter 45 positioned within said housing 54, and the top actuator 48 connected with said cutter 45. The cutter housing 54 has a channel or opening 56 within which the cutter 45 is slidably engaged and advanced or retracted by said top actuator 48. For the preferred embodiment, the mount 46 has the foam material 77 entrance slot 50 and the cutter housing 54 has the exiting slot 58. The exiting slot 58 aligns with an inserter slot 60 within the mount 46. An inserter tongue 70 interfaces or slidably fits with the inserter slot 60 and is connected with the middle actuator 72 near a rearmost base of the inserter tongue 70. The inserter tongue 70, when actuated by the middle actuator 72, forces the recently cut foam material 77 through the exiting slot 58 and into the channel 79 of the frame work piece 78. The middle actuator 72 is preferably mounted with the work table 18 but may also be mounted in a plurality of other fashions.

The foam material holder 62 comprises a holder tongue 64 which is also movably positioned within said channel 56 of the cutter housing 54. The holder tongue 64 is connected with and actuated or moved with said bottom actuator 66. The holder tongue 64 advances substantially flush with a bottom wall 52 of the entrance slot 50 prior to the cutter 45 advancing toward the foam material 77. When the cutter 45 advances toward the holder tongue 64, it pinches the foam material 77 there between and cuts the foam material 77. The cutter 45 and holder tongue 64 are then positioned whereby the cut foam material 77 is aligned with the exiting slot 58 whereby the inserter tongue 70 may perform insertion.

As described, the preferred embodiment utilizes pneumatic actuators. The pneumatic valves 76 direct compressed air into or vent the actuators connected therewith via tubing or lines. The valves 76 are controlled by the controller 74 pursuant to an operators input. As understood within the arts, appropriate electrical connections are made between the valves 76 and the controller 74.

A roll holder 34 attached with said frame 16 holds a roll of bulk foam material 77. The bulk foam material 77 is fed through one or more roller guides 36, under the serrations of the drive wheel 42 and atop the raised portion 30 of the table 18, and into the entrance slot 50. For the preferred embodiment, the front portion 20 of the work table 18 is adjustable in height for different sizes or types of work pieces 78. One or more height adjusters 22 are provided which allow the front portion 20 of the work table 18 to move substantially perpendicular relative to the plane of the exiting slot 58.

In operation an operator places a roll of bulk foam material 77 onto the roll holder 34, feeds the material 77 through the guides 36, under the drive wheel 42 of the feed, and into the entrance slot 50 of the cutting assembly 44. The controller 74 is programmed for a specific feed length and operation begins. The operator places a frame work piece 78 with a slot or channel 79 against the fence 28 which compresses the actuation switches 32. The cutter 45 in conjunction with the holder tongue 64 cuts a pre-programmed length of the foam material 77, aligns the foam material 77 with the exiting slot 58, and the inserter 68 forces the cut material 77 into the slot or channel 79 of the frame work piece 78. The foam material 77 is then fed by the feed and another insertion operation may begin.

The art of the present invention may be manufactured from a plurality of materials including but not limited to metals and alloys thereof, plastics, composites, or ceramics without departing from the scope and spirit herein intended. The apparatus may further be manufactured via molding, machining, casting, forging, pressing, laminating, carving, or utilization of stereo-lithographic or electro-dynamic milling or other techniques which are appropriate for the material utilized. For the preferred embodiment, the frame 16 is manufactured from a steel material and the work table 18 is manufactured from an aluminum material.

Although described for enablement purposes, the lengths, widths, and other dimensional attributes may depart significantly from those specified. The shape, size, location, component numbers and mounting methods utilized for the components described may take a plurality of forms as recognized within pertinent arts without departing from the scope and spirit of the present invention.

Having described the invention in detail, those skilled in the art will appreciate that modifications may be made to the invention and its method of use without departing from the spirit herein identified. Therefore, it is not intended that the scope of the invention be limited to the specific embodiments illustrated and described. Rather, it is intended that the scope of this invention be determined by the appended claims and their equivalents.

What is claimed is:

1. An adjustable foam insertion machine, comprising:
    a frame, a foam material feed, a foam material cutter assembly, a foam material holder, a foam material inserter, and a controller; and
    said frame having a work table upon which a work piece having a channel may be placed and a foam spacer inserted; and
    said foam material feed having a drive which drives a foam material into an entrance slot within said foam material cutter assembly; and
    said foam material cutter assembly having, a cutter, a top actuator, said entrance slot, a cutter housing, an exiting slot, and an inserter slot within which an inserter tongue slidably fits; and
    said foam material holder having a holder tongue connected with a bottom actuator; and
    said foam material inserter having said inserter tongue connected with a middle actuator which forces a cut foam material through said exiting slot; and
    said controller controlling said drive, said top actuator, said bottom actuator, and said middle actuator wherein said holder tongue advances substantially flush with a bottom wall of said entrance slot prior to said cutter advancing toward said foam material and said cutter advances toward said holder tongue and pinches said foam material there between and cuts said foam material forming said foam spacer and said cutter and said holder tongue then positioned whereby said foam spacer is aligned with said exiting slot and actuation of said inserter tongue forces said foam spacer through said exiting slot and into said channel of said work piece.

2. The adjustable foam insertion machine as set forth in claim 1, whereby:
    said drive of said foam material feed comprises a serrated drive wheel driven by a stepper motor controlled by said controller.

3. The adjustable foam insertion machine as set forth in claim 1, further comprising:
    one or more pneumatic valves controlled by said controller and connected with said top actuator, said bottom actuator, and said middle actuator; and
    said top actuator, said bottom actuator, and said middle actuator are pneumatic actuators.

4. The adjustable foam insertion machine as set forth in claim 2, further comprising:
    one or more pneumatic valves controlled by said controller and connected with said top actuator, said bottom actuator, and said middle actuator; and
    said top actuator, said bottom actuator, and said middle actuator are pneumatic actuators.

5. The adjustable foam insertion machine as set forth in claim 1, further comprising:
    a mount attached with and extending from said work table, said mount connected with said foam material cutter assembly; and
    said cutter housing having a channel or opening within which said cutter is slidably engaged and advanced or retracted by said top actuator.

6. The adjustable foam insertion machine as set forth in claim 2, further comprising:
    a mount attached with and extending from said work table, said mount connected with said foam material cutter assembly; and
    said cutter housing having a channel or opening within which said cutter is slidably engaged and advanced or retracted by said top actuator.

7. The adjustable foam insertion machine as set forth in claim 4, further comprising:
    a mount attached with and extending from said work table, said mount connected with said foam material cutter assembly; and
    said cutter housing having a channel or opening within which said cutter is slidably engaged and advanced or retracted by said top actuator.

8. The adjustable foam insertion machine as set forth in claim 1, further comprising:
    one or more actuation switches extending from a fence and capable of providing an input to said controller when said work piece is positioned against said fence.

9. The adjustable foam insertion machine as set forth in claim 3, further comprising:
    one or more actuation switches extending from a fence and capable of providing an input to said controller when said work piece is positioned against said fence.

10. The adjustable foam insertion machine as set forth in claim 4, further comprising:
    one or more actuation switches extending from a fence and capable of providing an input to said controller when said work piece is positioned against said fence.

11. The adjustable foam insertion machine as set forth in claim 1, further comprising:
    one or more roll holders capable of holding a roll of said foam material; and
    one or more guides for said foam material capable of guiding said foam material into said foam material feed and said entrance slot.

12. The adjustable foam insertion machine as set forth in claim 2, further comprising:
    one or more roll holders capable of holding a roll of said foam material; and
    one or more guides for said foam material capable of guiding said foam material into said foam material feed and said entrance slot.

13. The adjustable foam insertion machine as set forth in claim 8, further comprising:
   one or more roll holders capable of holding a roll of said foam material; and
   one or more guides for said foam material capable of guiding said foam material into said foam material feed and said entrance slot.

14. The adjustable foam insertion machine as set forth in claim 1, whereby:
   said controller is programmable for a length of said foam spacer desired.

15. The adjustable foam insertion machine as set forth in claim 8, whereby:
   said controller is programmable for a length of said foam spacer desired.

16. The adjustable foam insertion machine as set forth in claim 11, whereby:
   said controller is programmable for a length of said foam spacer desired.

17. The adjustable foam insertion machine as set forth in claim 1, whereby:
   said entrance slot is offset relative to said exiting slot.

18. The adjustable foam insertion machine as set forth in claim 1, whereby:
   said frame or work table has an idler wheel against which said a drive wheel compresses said foam material and feeds said foam material towards said cutter assembly.

19. The adjustable foam insertion machine as set forth in claim 2, whereby:
   said frame or work table has an idler wheel against which said drive wheel compresses said foam material and feeds said foam material towards said cutter assembly.

* * * * *